United States Patent [19]
Newman et al.

[11] Patent Number: 5,430,427
[45] Date of Patent: Jul. 4, 1995

[54] NTC SENSOR ROD FOR GLASS COOKTOPS

[75] Inventors: Robert L. Newman, Mansfield; James A. Tennant, Perrysville, both of Ohio

[73] Assignee: Therm-O-Disc, Incorporated, Mansfield, Ohio

[21] Appl. No.: 140,219

[22] Filed: Oct. 20, 1993

Related U.S. Application Data

[62] Division of Ser. No. 7,853, Jan. 22, 1993, Pat. No. 5,256,860.

[51] Int. Cl.$^6$ .............................. H01C 7/10; H01C 7/13
[52] U.S. Cl. ................................ 338/22 R; 219/464; 219/449
[58] Field of Search ............... 338/22 R, 22 SD, 23, 338/24, 25, 26, 330; 219/505, 504, 553, 464, 449, 448, 451, 452; 431/78, 75; 374/185

[56] References Cited

U.S. PATENT DOCUMENTS

| | | | |
|---|---|---|---|
| 1,279,321 | 9/1918 | Gardner | 219/504 |
| 2,339,635 | 1/1944 | Hall | 219/505 |
| 2,480,166 | 8/1949 | Schwartzwalder et al. | 338/22 R |
| 2,700,720 | 1/1955 | Torok | 338/22 R |
| 2,786,819 | 3/1957 | Smith et al. | 338/22 R |
| 3,029,331 | 10/1962 | Kovarik | 338/22 R |
| 3,284,418 | 11/1966 | Wildi | 338/22 R |
| 4,414,465 | 11/1983 | Newton et al. | 219/449 |
| 4,544,831 | 10/1985 | Bayer | 219/449 |
| 4,764,663 | 8/1988 | Scott | 219/448 |
| 5,055,819 | 10/1991 | Goessler et al. | 219/449 |
| 5,256,860 | 10/1993 | Newman et al. | 219/464 |
| 5,258,736 | 11/1993 | Kristen et al. | 338/22 R |

FOREIGN PATENT DOCUMENTS

| | | | |
|---|---|---|---|
| 2203661 | 8/1973 | Germany | 219/449 |
| 439665 | 9/1948 | Italy | 338/22 R |
| 53-29597 | 3/1978 | Japan | 338/22 R |
| 56-72716 | 6/1981 | Japan | 219/505 |
| 61-259508 | 11/1986 | Japan | 338/22 R |
| 3-84326 | 4/1991 | Japan | 219/453 |
| 3-105888 | 5/1991 | Japan | 219/553 |
| 3-141605 | 6/1991 | Japan | 338/22 R |
| 5-47455 | 2/1993 | Japan | 219/553 |
| 488370 | 5/1970 | Switzerland | 219/449 |
| 2060329 | 4/1981 | United Kingdom | 219/449 |
| 2067880 | 7/1981 | United Kingdom | 219/449 |

Primary Examiner—John A. Jeffery
Attorney, Agent, or Firm—Jones, Day, Reavis & Pogue

[57] ABSTRACT

The temperature of a glass cooktop is sensed by an elongated thermistor rod positioned below the cooktop. The thermistor rod has a negative temperature coefficient of electrical resistance and is connected in a control circuit for the cooktop heater. The opposite end portions of the thermistor rod are located outside of the housing for the cooktop heater so that electrical connections to such end portions are not exposed to extremely high temperatures.

1 Claim, 5 Drawing Sheets

NTC SENSOR ROD FOR GLASS COOKTOPS

This is a division application Ser. No. 08/007,853, filed Jan. 22, 1993 now U.S. Pat. No. 5,256,860.

BACKGROUND OF THE INVENTION

This application relates to the art of electrical controls and, more particularly, to such controls for controlling energization of an electric heater. The invention is particularly applicable for use in cooking appliances having glass cooktops and will be described with specific reference thereto. However, it will be appreciated that certain features of the invention have broader aspects and can be used in other environments.

Electric heaters for glass cooktops are commonly controlled by circuits that include a thermistor having a positive or negative temperature coefficient of electrical resistance. The thermistor may be fused to the cooktop itself or be located on a ceramic substrate forming part of a temperature sensing probe spaced below the cooktop.

SUMMARY OF THE INVENTION

An electric heater for a glass cooktop is controlled by a circuit that includes an elongated thermistor rod positioned intermediate the electric heater and the glass cooktop. Opposite end portions of the thermistor rod have electrodes thereon which are connected outside of the housing for the electric heater with a circuit for controlling the heater.

The length of the thermistor rod between its opposite terminal ends is at least six inches, and the rod has a cross-sectional area between about 0.001–0.25 square inches. The thermistor rod preferably has a negative temperature coefficient of electrical resistance so that its electrical resistance decreases with increasing temperature.

In a preferred form, the self-supporting thermistor rod is substantially cylindrical, although other cross-sectional shapes may be used.

The thermistor preferably has a resistance at 70° F. of about 30,000–50,000 Ohms and a resistance at 1,500° F. of about 5–10 Ohms.

It is a principal object of the present invention to provide an improved control for glass cooktops.

It is also an object of the invention to provide an improved thermistor for sensing and controlling the temperature of glass cooktops.

DESCRIPTION OF PREFERRED EMBODIMENTS

Figure 1:
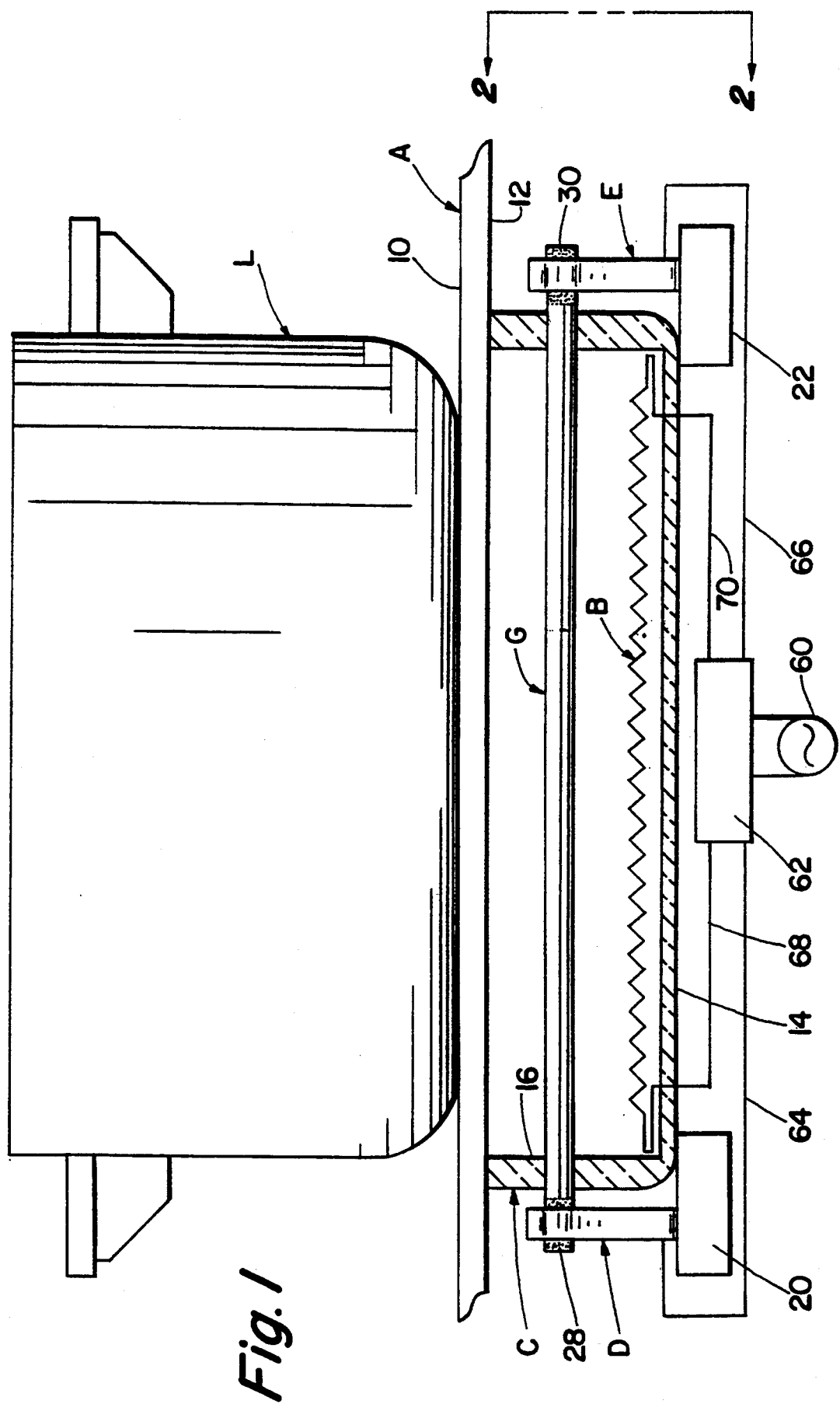
FIG. 1 is a cross-sectional elevational view of a glass cooktop and electric heater housing, and showing the elongated thermistor rod of the present application positioned between the heater and cooktop.

Referring now to the drawing, wherein the showings are for purposes of illustrating certain preferred embodiments of the invention only and not for purposes of limiting same, FIG. 1 shows a portion of a cooking appliance having a glass cooktop A with flat and parallel top and bottom surfaces 10, 12. An electric heater B spaced below cooktop bottom surface 12 is substantially enclosed in a housing C having a bottom wall 14 and a cylindrical peripheral wall 16. The top end of peripheral wall 16 engages bottom surface 12 of cooktop A. Electrical and thermal insulating material that lines housing C in a known manner is not shown for simplicity of illustration.

Dielectric supports 20, 22 support heater housing 14 and generally U-shaped spring contacts D, E that receive opposite end portions 28, 30 of an elongated self-supporting thermistor rod G positioned between heater B and bottom surface 12 of glass cooktop A.

Figure 2:
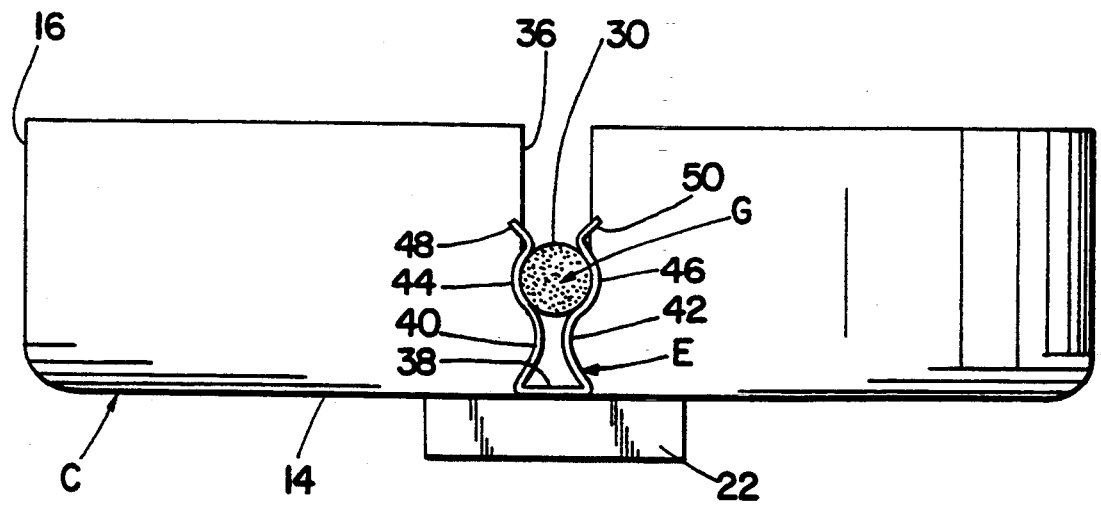
FIG. 2 is a side-elevational view taken generally on line 2—2 FIG. 1.

With reference to FIG. 2, peripheral wall 16 of heater housing C has diametrically opposite slots therein, only one of which is shown at 36 in FIG. 2. Spring contact E has a base 38 secured to support 22 and a pair of opposite converging legs 40, 42 that merge into outwardly curved circular portions 44, 46 which in turn merge into outwardly flared end portions 48, 50. End portion 30 of thermistor rod B is resiliently gripped within circular curved portions 44, 46. The width of slot 36 is sufficient to prevent contact between the periphery of the slot and thermistor rod B.

FIG. 1 shows a voltage source 60 connected with a control 62 which in turn is connected by leads 64, 66 with spring connectors D, E. Leads 68, 70 connect control 62 with electric heater B. A cooking pan L is shown positioned on cooktop A to define a load that receives heat from the cooktop.

When control 62 is manually turned on for heating cooktop A to a desired temperature, heater B radiates energy up to thermistor rod G and through glass top A onto load L. Load L sinks heat away from the glass cooktop. The temperature of thermistor rod G is dependent on the power through heater B and the temperature of cooktop A. The control maintains a wattage on heater B sufficient to heat load L without exceeding the maximum allowable temperature of cooktop A. When there is a change in the load on cooktop A, such as by removing load L therefrom, heat no longer sinks from cooktop A to the load. Therefore, cooktop A heats to a higher temperature. Thermistor rod G reacts to infrared energy so that rod G itself also heats to a higher temperature. The control senses the change in resistance of thermistor rod G and lowers the power to heater 8.

Thermistor rod G provides a closed loop active control for the glass cooktop. This allows the control to provide as much power as needed to give fast heat up times without overheating the glass cooktop. Thermistor rod G is heated by radiation from heater B, and by radiation that is reflected or emitted from cooktop A. When there is no load in the form of a cooking pan on cooktop A, thermistor rod G receives more emitted and reflected heat from cooktop A.

Self-supporting thermistor rod G has a length between its opposite terminal ends of at least six inches and more preferably at least about eight inches. Thermistor rod G is preferably cylindrical and has a diameter of about 0.2 inches. Obviously, other cross-sectional shapes may be used for certain purposes and the cross-sectional area of the thermistor material is between about 0.001–0.25 square inches. Obviously, the cross-sectional area of the thermistor material is toward the larger end of this range when the entire cross-sectional area of the rod is of thermistor material. The cross-sectional area of thermistor material is toward the lower end of the range when the rod is a composite, such as a rod of ceramic coated with a layer of the thermistor material. Opposite end portions 28, 30 of thermistor rod G are coated with silver paste that is fused onto the end portions of rod G. Thermistor rod G is made from a mixture of oxides such as manganese, nickel and cobalt oxides that are milled and mixed with suitable binders such as water and alcohol. The material is then extruded through a die to cylindrical shape. The rod is then sintered to produce a ceramic-like self-supporting thermistor rod. The oxides are mixed to provide the thermistor rod with a negative temperature coefficient of electrical resistance such that its resistance is about 30,000–50,000 Ohms at 70° F. and about 5–10 Ohms at 1,500° F.

Figure 3:
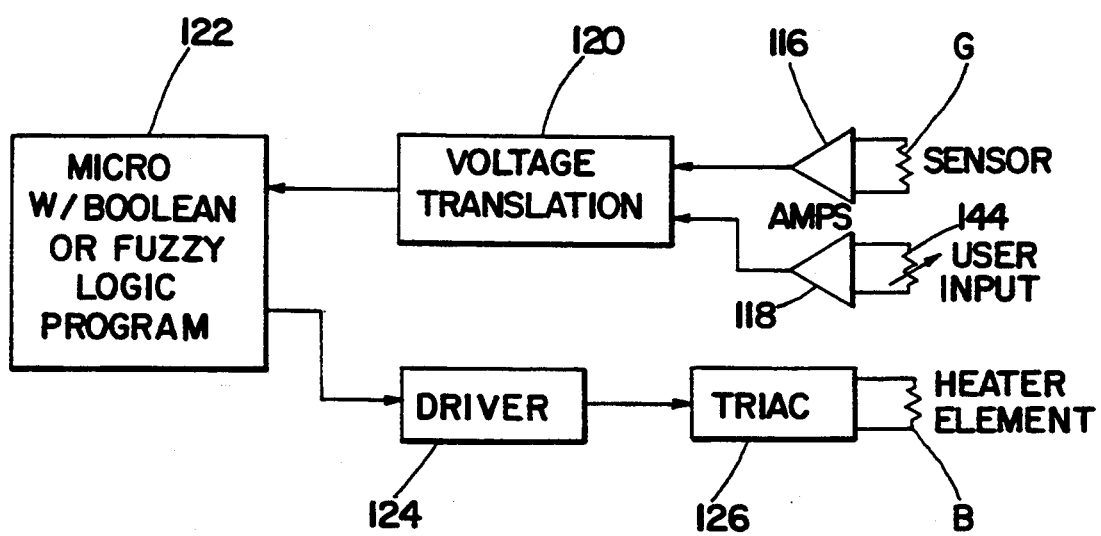
FIG. 3 is a schematic of a control circuit.
Figure 4:
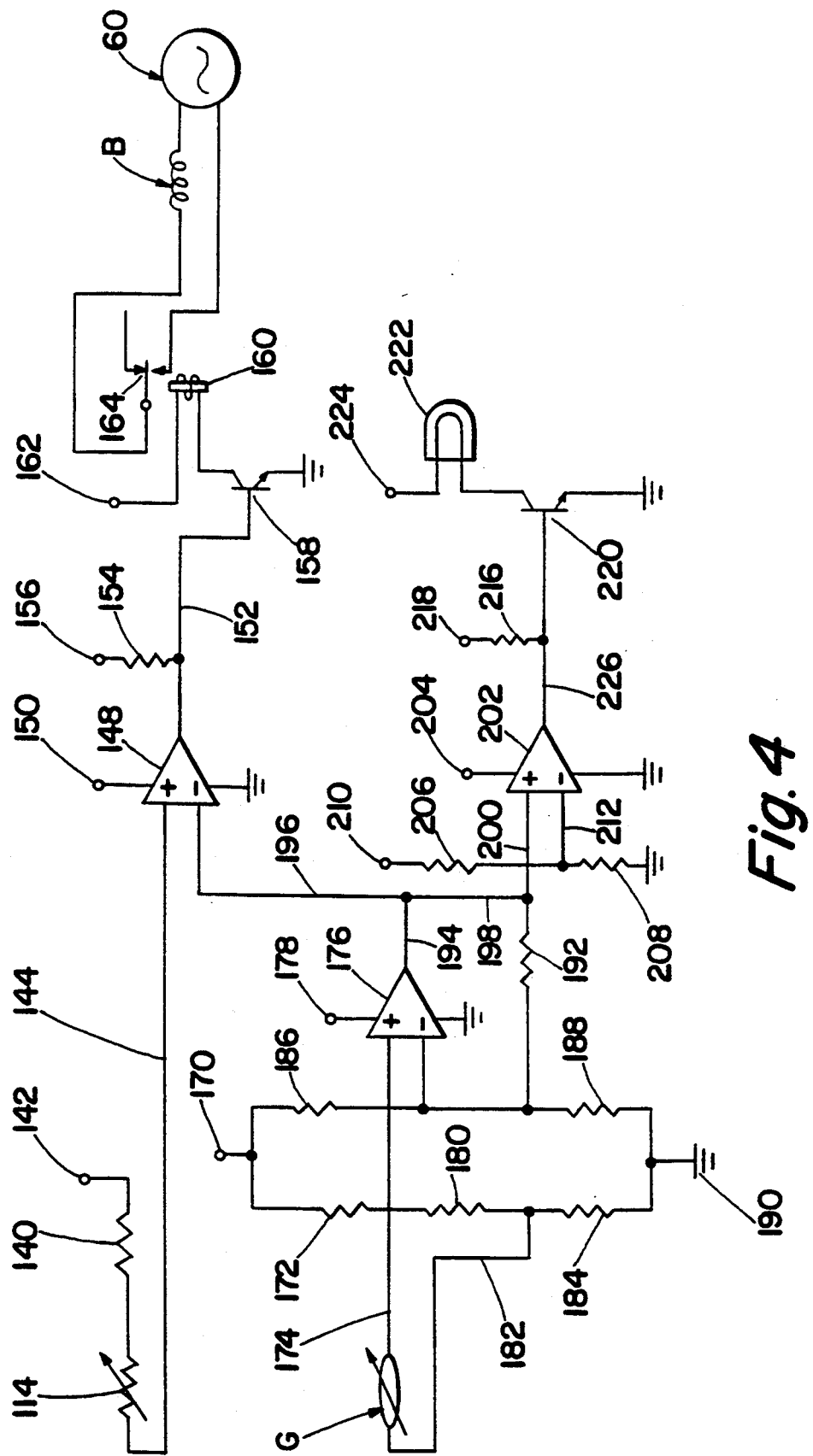
FIG. 4 is a schematic of an on-off control circuit.
Figure 5:
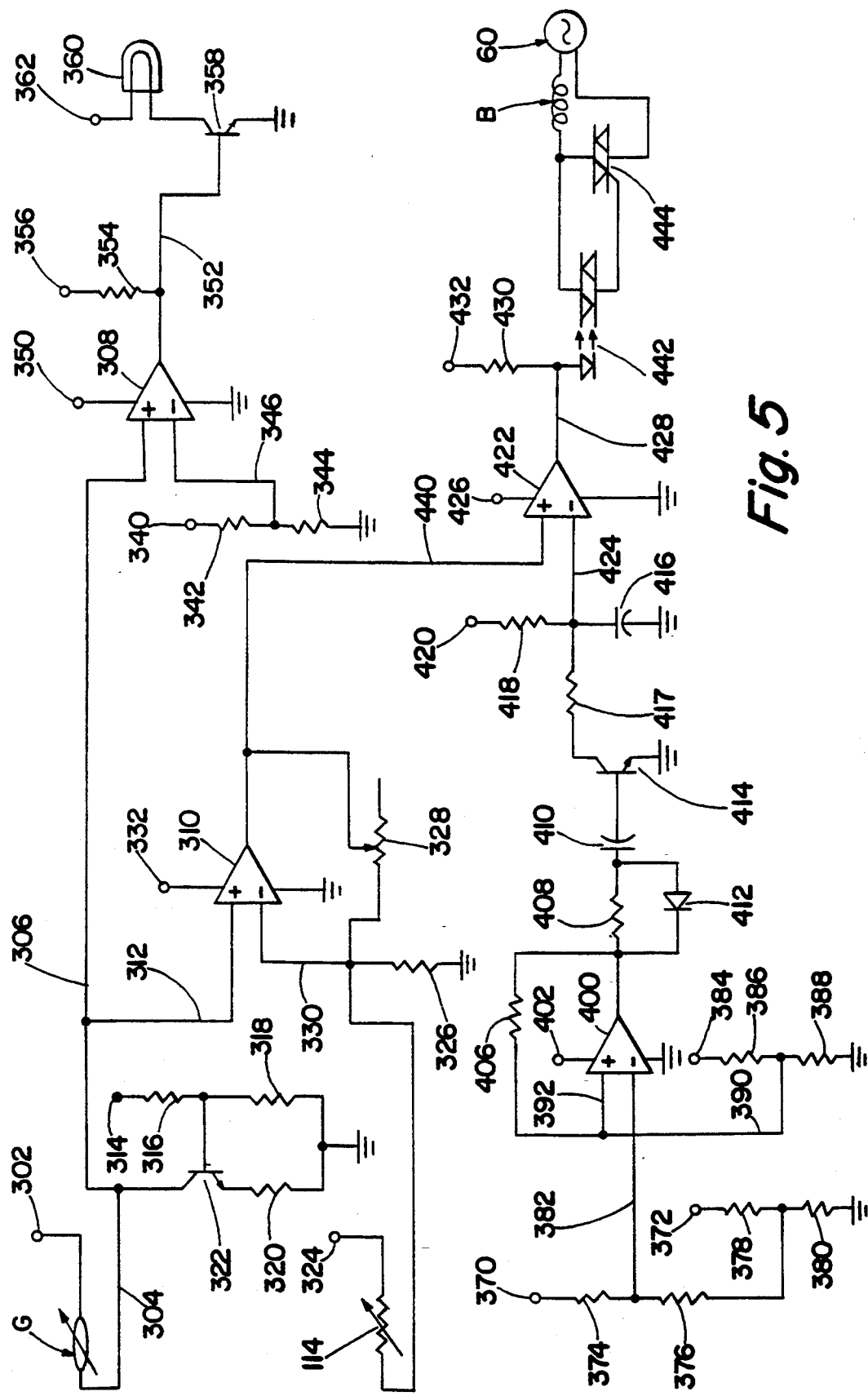
FIG. 5 is a schematic a proportional control circuit.
Figure 6:
FIG. 6 is a side elevational view of a negative temperature coefficient thermistor rod constructed in accordance with the present application.

FIGS. 3–5 show a control for glass cooktops that responds to loads on the cooktop without physically touching same. The control measures infrared energy emitted or reflected from the glass cooktop for controlling the cooktop heater.

The control includes a thermistor positioned beneath the glass cooktop for responding to infrared energy emitted or reflected from the cooktop. The thermistor has a negative temperature coefficient of electrical resistance so that its electrical resistance decreases with increasing temperature. Therefore, a lower voltage is present across the thermistor as the temperature of the thermistor increases, at a constant or limited current.

A manually adjustable input signal is compared with the thermistor signal for controlling a heating element. When the input signal is higher than the thermistor signal, the heating element is on. When the thermistor signal is equal to or higher than the manual input signal, the heating element is off. When a load (pan) is removed from the cooktop, more infrared energy is emitted and reflected toward the thermistor from the cooktop so that it rapidly increases in temperature and turns the heating element off.

FIG. 3 shows a negative temperature coefficient thermistor G and manually adjustable potentiometer 114 connected through amplifiers 116, 118 with a voltage translator 120. A microprocessor 122 commands voltage translator 120 to read outputs from thermistor G and potentiometer 114. Voltage translator 120 feeds the outputs from thermistor G and potentiometer 114 to microprocessor 122 where the signals are compared. If the signal from potentiometer 114 is greater than the signal from thermistor G, microprocessor 122 commands driver 124 to gate triac 126 and energize heating element 28. When the output from thermistor G is equal to or greater than the output of potentiometer 114, microprocessor 122 commands driver 124 to cut off the gate signal to triac 126 and this de-energizes heating element B. Microprocessor 122 may include boolean or fuzzy logic programming whereby the signals from thermistor G and potentiometer 114 are compared to historical or average voltages supplied to heating element 128 with and without a load (pan) on the glass cooktop.

With reference to FIG. 4, resistor 140 connects DC voltage source 142 with potentiometer 114, and cooperates with the potentiometer to form a voltage divider for limiting the maximum voltage on the potentiometer wiper. Line 144 connects the potentiometer wiper with a comparator 148 having a DC voltage source 150.

The output of comparator 148 is connected by line 152 with one end of a resistor 154 having a DC voltage source 156, and with the base of a transistor 158. Resistor 154 serves as a pull-up resistor to provide a positive current source for the output from comparator 148.

Gating of transistor 158 energizes a relay 160 having a DC voltage source 162 to close normally open switch 164 and connect glass cooktop heating element B with voltage source 166.

DC voltage source 170 is connected through resistor 172 and line 174 with thermistor G. Line 174 extends in an opposite direction from thermistor G to connection with operational amplifier 176 having a DC voltage source 178. Resistor 180 is connected in parallel with thermistor G through lines 174 and 182, and serves to linearize thermistor G. Resistor 172 and resistor 184 serve as current limiters for thermistor G, and also limit the range of signal voltage that is impressed on the non-inverting input of operational amplifier 176.

Resistors 186 and 188 form a voltage divider across DC voltage source 170 and ground 190. Resistor 192 sets the gain of operational amplifier 176, and also cooperates with resistors 186, 188 to limit the input range over which operational amplifier 176 operates in a linear fashion. That is, the output of operational amplifier 180 swings to the voltage rail when the input is outside of the linear range.

Lines 194, 196 connect the output of operational amplifier 176 with comparator 148. When the voltage on comparator 148 from potentiometer 114 through line 144 is less than the voltage on comparator 148 from operational amplifier 176 through lines 194, 196, the output of comparator 148 goes to a high level. This allows the current through resistor 154 to gate transistor 158 on for energizing relay 160 to close switch 164 and connect heating element B with voltage source 60.

Lines 194, 198 and 200 connect the output of operational amplifier 176 with comparator 202 having a DC voltage source 204. Resistors 206, 208 connected with DC voltage source 210 form a voltage divider connected through line 212 with comparator 202. When the voltage impressed on comparator 202 through line 212 is less than the voltage impressed thereon from operational amplifier 176 through lines 194, 198, 200, the output of comparator 202 goes to a high level and the current through resistor 216 from DC voltage source 218 gates transistor 220 on to energize signal lamp 222 through DC voltage source 224. The output of comparator 202 is connected by line 226 with one end of resistor 216 and with the base of transistor 220.

Increasing temperature of the system results in decreasing resistance of thermistor G and lowering of the voltage on line 182. This causes the output of operational amplifier 176 to decrease and this causes the outputs from comparators 148 and 202 to go low. When this occurs, the current through resistors 154, 216 will no longer gate transistors 158, 220. This de-energizes relay 160 to open switch 164 and disconnect heating element B from voltage source 60. This also disconnects signal lamp 222 from voltage source 224.

FIG. 5 shows DC voltage source 302 for thermistor G which is connected through lines 304, 306 with comparator 308, and with operational amplifier 310 through lines 304, 306 and 312. A DC voltage source 314 is connected with resistors 316, 318, 320 and transistor 322 which cooperate to form a constant current source for thermistor G. As the temperature of thermistor G increases, its resistance decreases and this causes an increase in the voltage on lines 304, 306.

DC voltage source 324 is connected with potentiometer 114 which cooperates with resistor 326 and rheostat 328 to set the gain of operational amplifier 310. Potentiometer 114 is connected with operational amplifier 310 through line 330, and the amplifier has a DC voltage source 332. The output of operational amplifier 310 is the product of the voltage differential between line 312 from thermistor G and line 330 from potentiometer 114, adjusted by the gain factor of amplifier 340 as set by potentiometer 114, resistor 326 and rheostat 328.

DC voltage source 340 is connected with resistors 342, 344 that form a voltage divider connected with comparator 308 through line 346. Comparator 308 has a DC voltage source 350 and its output is connected through line 352 with one side of a resistor 354 having a DC voltage source 356 and with the base of a transistor 358. The output of comparator 308 is pulled to a high level through resistor 354 when the voltage from thermistor G on line 306 is greater than the voltage on line 346. This gates transistor 358 on and energizes signal light 360 through DC voltage source 362.

AC voltage source 370 and DC voltage source 372, along with resistors 374, 376, 378 and 380, impress a sine wave with a DC voltage offset on line 382. DC voltage source 384 is connected with resistors 386, 388 to provide a voltage divider connected through lines 390, 392 with comparator 400 having a DC voltage source 402. When the voltage from the DC offset sine wave on line 382 is less than the voltage from the voltage divider on line 392, the output of comparator 400 goes high. Resistor 406 provides hysteresis in the output of comparator 400. Resistor 408, capacitor 410 and diode 412 form a pulse network that provides a single pulse to the base of transistor 414 each time the output of comparator 400 goes high.

Each time that transistor 414 is gated on, capacitor 416 is discharged to ground through resistor 417 and transistor 414. When the base of transistor 414 is not gated, capacitor 416 charges through resistor 418 from DC voltage source 420 to provide a ramping wave form to comparator 422 through line 424. Comparator 422 has a DC voltage source 426 and its output is connected through line 428 with resistor 430 connected with a DC voltage source 432 and with a light emitting diode in an opto-coupler 442. When the ramping wave form on line 424 to comparator 422 is less than the output of operational amplifier 310 through line 440, the output of comparator 422 is pulled to a high level through resistor 430. As the output of comparator 322 goes to a high level, the light emitting diode in opto-coupler 442 is energized to gate triac 444 and connect heater B with voltage source 60.

As the resistance of thermistor G changes, the duty cycle of the output of comparator 422 changes and causes triac 444 to have a varying duty cycle. This in turn varies the power to heater B.

Although the invention has been shown and described with respect to certain preferred embodiments, it is obvious that equivalent alterations and modifications will occur to others skilled in the art. The present invention includes all such equivalent alterations and modifications, and is limited only by the scope of the claims.

We claim:

1. A thermistor rod for spanning an electric heating element in a glass cooktop and for connection in a control circuit that modulates an electric heating element in a glass cooktop by responding to temperature varying electrical resistance characteristics of the thermistor rod, said rod including thermistor material having a negative temperature coefficient of electrical resistance so that its electrical resistance decreases with increasing temperature, said rod having opposite end portions coated with a low resistance conductor material for connecting said rod in a circuit, said rod having opposite terminal ends and a length between said terminal ends of at least six inches, said thermistor material having a cross-sectional area between about 0.001–0.25 square inches, said rod having a room temperature resistance between said opposite end portions of about 30,000–50,000 Ohms and a resistance between said opposite end portions at 1,500° F. of about 5–10 Ohms, the entire outer surface and crone sectional area of said rod along the entire length thereof between said opposite end beige made of the same thermistor materials and said rod being in electrical series and not in electrical parallel between said opposite end portions.

* * * * *